M. T. LOTHROP.
PROCESS OF MANUFACTURING METAL RINGS.
APPLICATION FILED JAN. 26, 1921.

1,402,508. Patented Jan. 3, 1922.

Inventor:
Marcus T. Lothrop,
by Emery & Emery,
his Attorneys.

UNITED STATES PATENT OFFICE.

MARCUS T. LOTHROP, OF CANTON, OHIO, ASSIGNOR TO THE TIMKEN ROLLER BEARING COMPANY, OF CANTON, OHIO, A CORPORATION OF OHIO.

PROCESS OF MANUFACTURING METAL RINGS.

1,402,508.            Specification of Letters Patent.         Patented Jan. 3, 1922.

Application filed January 26, 1921. Serial No. 440,040.

*To all whom it may concern:*

Be it known that I, MARCUS T. LOTHROP, a citizen of the United States, and a resident of the city of Canton, in the county of Stark and the State of Ohio, have invented a new and useful Improvement in Processes of Manufacturing Metal Rings, of which the following is a specification.

My invention relates to the manufacture of metal rings and tubular articles, and has for its principal objects to simplify and cheapen the process of manufacturing such articles and to make them with a more accurately formed and highly finished bore than is practicable by other processes. The invention consists principally in forming the bore with a roughly circular cross section of substantially the diameter desired for the finished article and obliterating the irregularities by forcing endwise thereof a plug of circular section and of a diameter very slightly larger than that desired for the finished bore; and the invention also consists in setting the tool that cuts the bore so as to "chatter," (that is, tremble and cut numerous indentations in the work); and then forcing a highly finished and hardened sphere through the irregular bore thus formed, thereby giving said bore a high degree of finish and a true cylindrical form.

Figure 1:
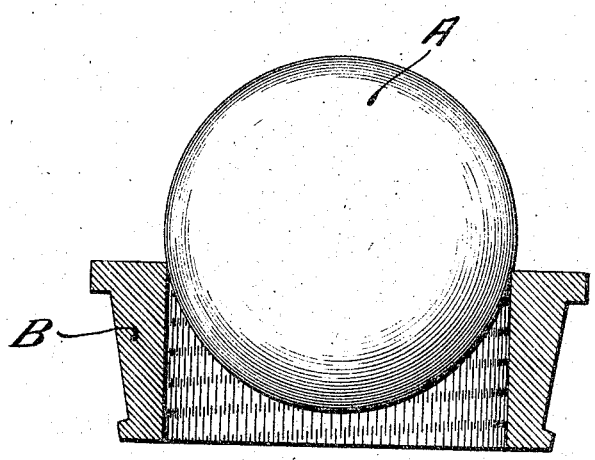
Figure 2:
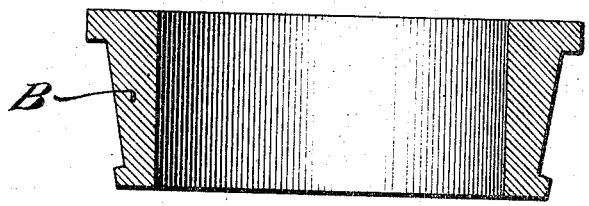

In the drawings wherein like reference numerals indicate like parts in the several views, Fig. 1 is a sectional view showing a roller bearing cone having a bore formed with irregularities therein according to my invention and a sphere in position to be forced therethrough; and Fig. 2 is a similar view showing the finished cone with a smooth cylindrical bore of slightly larger diameter than that of the rough cone shown in Fig. 1.

One stage in the process of manufacturing metal rings such as roller bearing cones, commonly practiced, comprises the turning of the cylindrical bore thereof in a screw machine or the like. According to my process the cutting tool of such screw machine is set above or below the center line of the work, instead of at the center line of the work (which is the common practice). The result of the cutting tool not being at the center line of the work is that it "chatters," that is, jars or trembles and produces a bore which is only approximately circular in section, the circularity of said bore being broken by numerous ridges and indentations. The bore of the cone has thus a multiplicity of radially projecting small areas.

A hardened and highly finished sphere A of slightly larger diameter than the diameter of the bore of the cone B is then forced through the bore to give it a true cylindrical form of the proper size. The ridges produced in the bore by the cutting tool comprise radially projecting small areas which extend lengthwise of the bore, and are thus in position to be most advantageously pressed down by the sphere, instead of being broken off or folded over. As the sphere is pressing against relatively small areas at a given time, its work is made easy and the results of the passing of the sphere through the bore are more permanent. The flattening down of the ridges tends to set up a plastic flow of the metal of the cone, causing the low spots to fill up and giving the bore the proper form and a highly finished surface.

On account of the elasticity of the metal, the cone will spring in or shrink slightly after the sphere has passed through it, and for this reason the diameter of the sphere should be slightly larger than that desired for the bore of the finished ring.

A cone having the plurality of radially projecting small areas produced by the chattering of the cutting tool is better adapted for the subsequent operation of forcing the sphere through the bore thereof than is a cone which is turned in the usual manner with a cutting tool set at the center line because it distributes the work to be done by the sphere in small quantities and affords space for a plastic flow of the metal. By my process a smooth and regular surface is formed, the tearing or breaking off of parts of the cone such as are incidental to grinding and like operations are minimized, and as the sphere has to do only a comparatively small amount of work at a given time, the results of the work are more permanent.

Instead of a sphere a plug of circular cross section and having a comparatively small working surface may be used to smooth the irregularities of the bore.

The turning of the bore is not an essential step of my process, as it is possible to produce a bore having the desired irregularity in other ways,

What I claim is:

1. The process of making metal rings which comprises forming the rough article with a substantially cylindrical bore having a multiplicity of radially projecting and longitudinally extending ridges and then forcing through said bore a plug having a comparatively small working surface of circular cross section slightly larger than the diameter of said bore.

2. The process of making metal rings, such as cones for roller bearings, which comprises cutting the bore thereof by means of a cutting tool set to leave a multiplicity of radially projecting and longitudinally extending ridges therein and then forcing through said bore a hardened and highly finished sphere of slightly larger diameter than the diameter of said bore.

3. The process of making metal rings, such as cones for roller bearings, which comprises turning the cylindrical bore thereof with a tool set to chatter and then forcing through said bore a hardened and highly finished spherical body of slightly larger diameter than the diameter of said bore.

Signed at Canton, Ohio, this 20th day of Jan., 1921.

MARCUS T. LOTHROP.